US006250500B1

(12) United States Patent
Schweiberer

(10) Patent No.: US 6,250,500 B1
(45) Date of Patent: Jun. 26, 2001

(54) DISPENSING APPARATUS

(76) Inventor: Franz Schweiberer, Klenzestrasse 105, 80469, München (DE)

(*) Notice: Subject to any disclaimer, the term of this patent is extended or adjusted under 35 U.S.C. 154(b) by 0 days.

(21) Appl. No.: 09/369,862

(22) Filed: Aug. 9, 1999

(30) Foreign Application Priority Data

Sep. 7, 1998 (DE) ........ 198 40 844
Sep. 7, 1998 (DE) ........ 298 23 295 U
Mar. 29, 1999 (DE) ........ 199 14 265

(51) Int. Cl.[7] ........ B65G 59/02

(52) U.S. Cl. ........ 221/244; 221/241; 271/126; 271/130; 414/796.8

(58) Field of Search ........ 271/126, 128, 271/130, 30.1, 31; 221/240, 241, 271, 268, 244, 13, 14, 213; 414/796.7, 796.8, 796.9, 797, 797.1

(56) References Cited

U.S. PATENT DOCUMENTS 3,747,733 * 7/1973 Knickerbocker ........ 221/241 X
4,448,328 * 5/1984 Wingate ........ 221/13
4,461,466 * 7/1984 Uchida et al. ........ 271/126 X
4,496,074 * 1/1985 Owens ........ 221/241 X
4,501,379 * 2/1985 Halone et al. ........ 221/241 X
4,889,221 * 12/1989 Schlumpf ........ 221/213 X
5,018,940 * 5/1991 Hognestad et al. ........ 414/769.8
5,165,571 * 11/1992 Schlumpf ........ 221/213
5,178,299 * 1/1993 Mundt ........ 221/240 X
5,411,246 * 5/1995 Nonomura et al. ........ 271/126 X

* cited by examiner

*Primary Examiner*—Christopher P. Ellis
*Assistant Examiner*—Patrick Mackey

(57) ABSTRACT

An apparatus for individually dispensing printed articles such as newspapers comprises a housing and a movable table in the housing for carrying in readiness a stack of printed articles on the table. A removal device permits access to a printed article in respect of which payment has been made and a feed pushes a respective printed article out of the apparatus. An actuator is provided for activating the feed. A drive displaces the table by a desired travel length to the article-removal position, under the control of sensing and control device for controlling the travel length of the table. A braking and stopping means is operable to stop and release the drive in the operating cycle of the apparatus.

14 Claims, 4 Drawing Sheets

DISPENSING APPARATUS

FIELD OF THE INVENTION

The invention concerns generally a dispensing apparatus for the separate dispensing of printed articles, for example for the sale of printed articles such as newspapers and the like by means of an automatic sales machine.

The term printed article is used hereinafter in this specification to denote any form of printed article which can be dispensed separately and individually by a dispensing apparatus, for example newspapers, magazines, journals and the like.

BACKGROUND OF THE INVENTION

A typical form of dispensing apparatus for printed articles such as for the sale of newspapers includes a displaceable table disposed in the apparatus housing, for supporting in readiness a stack of printed articles arranged on the table. The apparatus includes a removal means such as to permit access to a printed article, once suitable payment has been made for same. A feed means is operative to push the respective printed article for which payment has been made, out of the apparatus housing.

Reference may be made in this respect to German utility model No 298 23 295 describing an apparatus of such a general configuration, comprising more specifically a stationary table on which a stack of newspapers is disposed. The stack is covered by a dispensing slide or carriage on which a removal slot is provided. Arranged on the slide or carriage is the feed means which, after payment has been rendered for the printed article required, permits access to the uppermost article on the stack by virtue of pushing that article forwardly, and that article thus issues from the slot to be taken by the purchaser. In that apparatus the feed means is activated by lifting the cover of the housing.

A disadvantage with a dispensing apparatus of that kind is that the position of the removal means is continuously changing as the stack of articles is consumed, and precautionary measures have to be taken in order to permit access to the stack of articles, over the entire height thereof. As the stack heights can be between 30 and 40 cm, it is a relatively complicated and expensive matter to ensure that access can be afforded to the stack over such a height.

SUMMARY OF THE INVENTION

An object of the present invention is to provide a dispensing apparatus for printed articles from a stack thereof, which permits such an article to be removed from the stack in a simple and inexpensive manner without the location at which the article is removed from the stack varying as the height of the stack alters.

Another object of the present invention is to provide a dispensing apparatus for the sale of newspapers by means of an automatic sales machine, which is so designed as to ensure that the newspapers to be dispensed are always presented to a prospective purchaser at at least substantially the same position, together with a reduced possibility of more than two newspapers being dispensed from the apparatus at the same time.

Still another object of the present invention is to provide a printed article-dispensing apparatus of which the operating structure is reliable and robust to withstand the possibly harsh operating conditions under which it may be expected to work.

In accordance with the principles of the present invention the foregoing and other objects are attained by a dispensing apparatus for separately dispensing printed articles, such as for the sale of newspapers by means of an automatic sales machine, comprising a housing and a displaceable table accommodated in the housing, the table being designed to hold in readiness a stack of printed articles disposed thereon. The apparatus further includes a removal means which permits access to a printed article for which payment has been made, and a forward feed means for pushing out a respective printed article for the purchaser to receive. An actuating means is adapted to activate the feed means. The apparatus further includes a drive means for displacing the table by a desired travel length, in conjunction with sensing and control means for controlling the table travel length. A braking and stopping means is operable to stop and start the drive means as required.

It will be noted at this point that some forms of copier machines have displaceable tables on which the copy paper is stacked and which are moved with a stepwise movement to the correct removal height, but it will be observed that this principle cannot be applied to dispensing apparatuses for automatic newspaper sales machines as the latter are required to be of a very robust and strong structure and capable of continued operation irrespective of climatic influences. The construction according to the invention provides that the stack of printed articles such as newspapers, after removal of the uppermost article from the stack, is displaced by the desired travel length until the sensing and control means stop the drive means by way of the braking and stopping means.

In a preferred feature of the invention the drive means for displacing the table comprises a spring which displaces the table until the sensing and control means activate the braking and stopping means.

In another advantageous feature of the invention the braking and stopping means is coupled to a cable drum with a holding cable which is wound thereon, wherein the free end of the cable is fixed to the table. That provides an extremely simple and accurately controllable feed means which, when the cable drum is released, by virtue of the spring force, advances the table with the desired displacement, while braking and arresting the cable drum stops the cable-unwinding step which involves the cable being unwound from the cable drum and which is produced by virtue of the feed movement of the table, so that the spring cannot further move the table.

A preferred feature of the invention provides that the sensing and control means effect control when the next printed article to be dispensed is to be positioned at the removal means. Depending on the geometrical configuration of the removal means, a feed movement for a printed article could also occur only when a second article has been pushed out, in which case however the removal means in the form of a suitable slot must be of a height corresponding to at least two printed articles one upon the other. That however could then result in undesired or unauthorised removal of more than one article from the apparatus, as the removal slot allows space for appropriate manipulation operations if the person implementing such operations has thin fingers or appropriate implements.

A further preferred feature of the invention provides that the sensing and control means include lever means which by way of cable and roller means actuate a brake on the braking and stopping means. The lever means advantageously lie directly or indirectly on the uppermost article in the stack and move down when that article has been pushed out of the stack. As a result of that downward movement, the brake on the braking and stopping means is released by way of the cable and roller means and the brake is actuated again when the lever means are raised, by virtue of the advance movement of the table.

In another preferred feature of the invention the braking and stopping means has a gear transmission arrangement which reduces the output rotary speed at the cable drum. That makes it possible to achieve extremely accurate positioning of the respective uppermost printed article in the stack, in relation to the removal means. Furthermore the brake can involve very low levels of braking force, although high spring forces must be involved in order to move the table.

A preferred feature of the invention also provides that, upon oppositely directed movement of the table, when the apparatus is loaded with a stack of printed articles, the holding cable is wound on to the cable drum. That can advantageously be effected by a winding cable which is adapted to be wound on the cable drum in opposite relationship to the holding cable which is connected to the table. In that assembly the winding cable can alternatively be secured with the free end to the side of the table which is towards the printed articles carried thereon, or, possibly on a separate device, it can be wound on to the drum under a spring stress and can be unwound therefrom against the spring stress, the greater the degree of movement of the table in the direction of the removal means.

In another embodiment the cable drum can be acted upon directly or indirectly by a winding spring, in such a way that, when the table is loaded with printed articles, the cable drum is caused to rotate to wind the holding cable on to it.

In a further preferred feature of the invention the apparatus has stop means for holding the table in the filling position for loading thereof with printed articles.

Desirably the housing has an opening which is closable by a door and which is opened for loading with printed articles, the door activating the stop means in the opened condition of the door.

Further objects, features and advantages of the invention will be apparent from the description hereinafter of preferred embodiments thereof.

DESCRIPTION OF PREFERRED EMBODIMENTS

Figure 1:
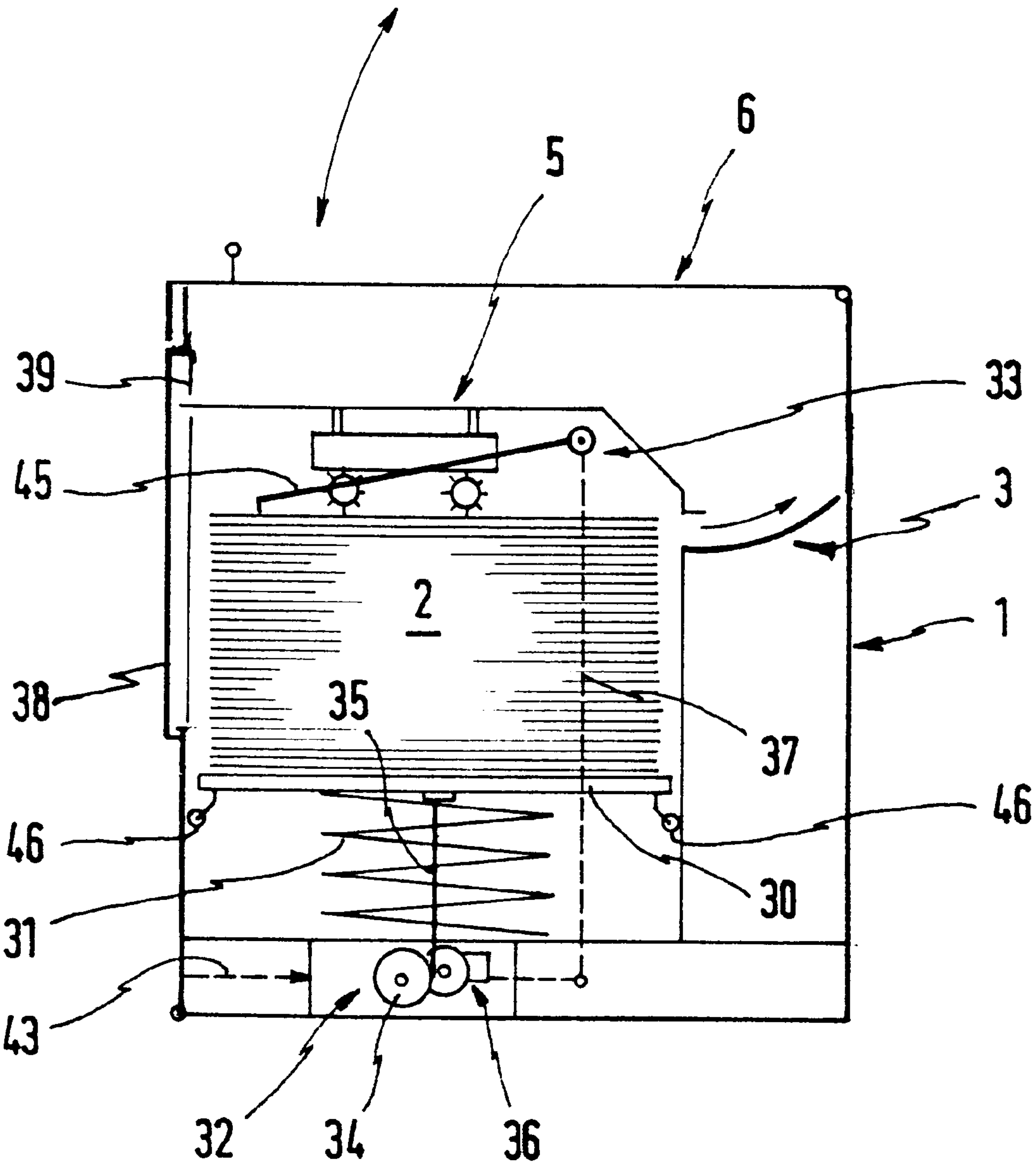
FIG. 1 is a diagrammatic view of a first embodiment of a dispensing apparatus according to the invention showing the displaceable table, drive means, sensing and control means and braking and stopping means.

Referring firstly to FIG. 1, shown therein is a diagrammatic view of a dispensing apparatus for the separate or individual dispensing of printed articles, for example as illustrated newspapers, which are to be sold by being dispensed from an automatic sales machine upon suitable payment for same. The dispensing apparatus comprises a housing generally indicated by reference numeral 1 and a displaceable table which is generally indicated at 30 and which is disposed in the interior of the housing 1. In the illustrated embodiment in FIG. 1 the table is displaceable upwardly in a vertical direction in order by such movement to bring the uppermost printed article constituting a stack 2 thereof in the housing 1, to the level of a removal means as diagrammatically indicated at 3 in FIG. 1, for example in the form of a removal slot. It will be seen therefore that, as printed articles are successively removed from the stack 2 thereof in the housing 1, the table 30 will be displaced upwardly so that the uppermost article in the stack 2 is always at the level of the removal means 3.

Reference numeral 5 in FIG. 1 indicates a forward feed or advance means 5 which is disposed in the housing 1, for pushing a respective printed article 2 out of the housing 1 through the removal means 3. The feed means 5 is activatable by way of actuating means generally indicated at 6. The feed means 5 can be a feed means as is described in German utility model No 298 23 295.2 to which reference is made for suitable incorporation of the contents thereof in this specification.

The table 30 is held in position in the housing 1 by rollers 46 which bear in rolling contact against the walls of the housing 1. The table 30 is urged upwardly within the housing 1 by a drive means generally indicated at 31. In the FIG. 1 embodiment the drive means comprises a spring 31. The upward displacement of the table 30 by means of the spring 31 is regulated by sensing and control means 33. A braking and stopping or securing means 32 co-operates with the sensing and control means 33. The braking and stopping means 32 is coupled to a cable drum 34 having a holding cable 35 which can be wound on to and unwound from the cable drum 34. The free end of the holding cable 35 which is wound on to the cable drum 34 is fixed to the table 30 at the underside thereof. It will be seen therefore that the spring 31 can move the table 30 with the stack of printed articles 2 arranged thereon, in the upward direction within the housing 1, only when the braking and stopping means 32 is released. The braking and stopping means 32 co-operates with a gear transmission arrangement 42 which is operable to reduce the output rotary speed applied at the cable drum 34.

The sensing and control means 33 have lever means indicated at 45 which, by way of cable and roller means 37, actuate a brake 36 of the braking and stopping means 32. The brake 36 acts on a predetermined gear of the gear transmission arrangement 42, which gear can be suitably provided with a brake drum. By virtue of a suitable choice in respect of such a gear forming part of the gear transmission arrangement 42, only very low actuating forces are required to cause the brake 36 to come into operation.

The housing 1 is provided with an opening 39 for loading the table 30 with the stack of printed articles 2. The opening 39 is closed by an openable door 38. The door 38 is operatively connected to the braking and stopping means 32 by way of stop means 43 in order to provide that the table is held in the filling position for loading an at least partly empty dispensing apparatus with printed articles. The door 38 is thus operable to activate the stop means 43 to bring the braking and stopping means 32 into operation, when the door is in the opened condition.

Figure 2:
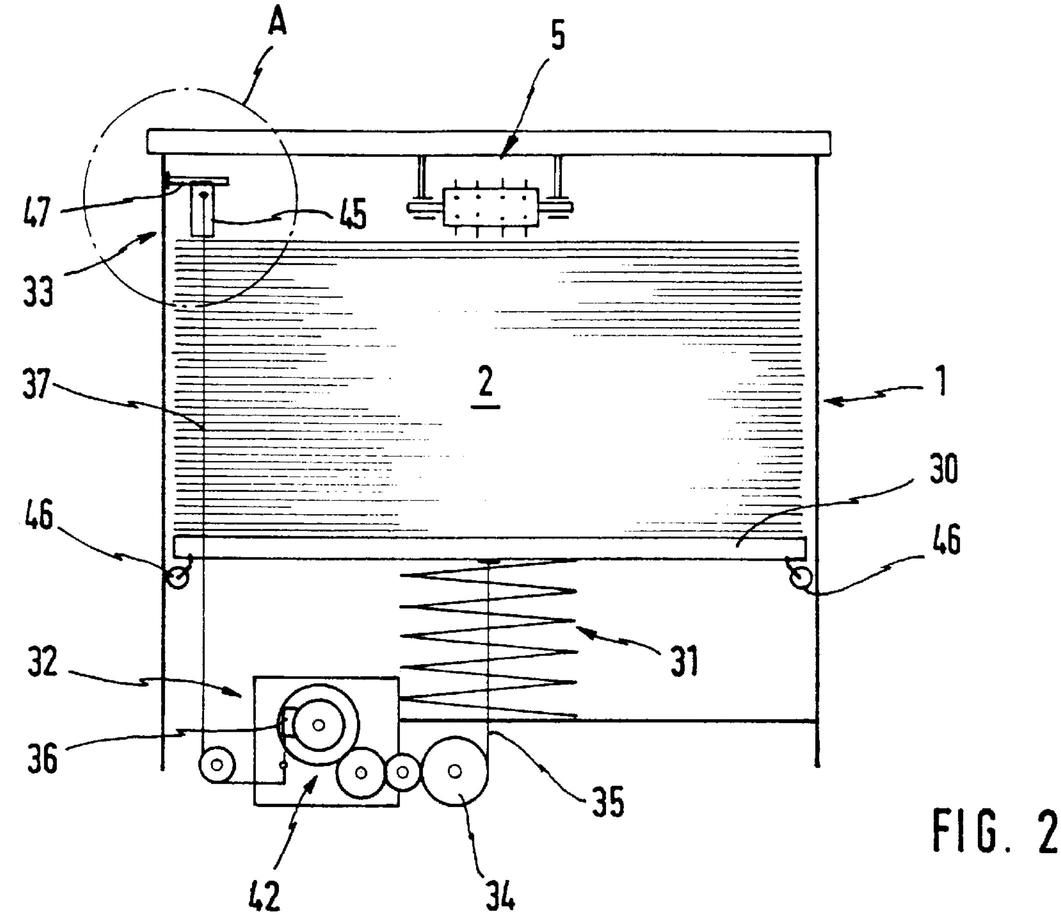
FIG. 2 shows a further embodiment of a dispensing apparatus.
Figure 3:
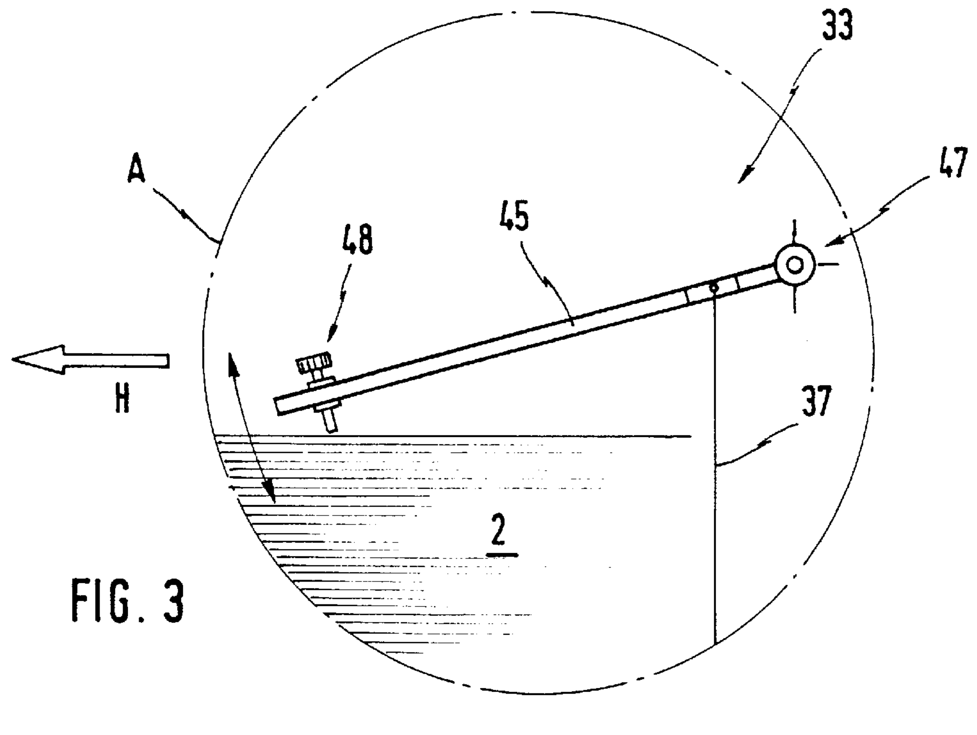
FIG. 3 is a view of the detail indicated at A in FIG. 2.

Referring now to FIG. 2, diagrammatically shown therein is an alternative structure in accordance with the invention, in regard to mounting the sensing and control means 33 to a side wall of the housing 1. The detail indicated at A in FIG. 2 in respect of the sensing and control means 33 is shown on an enlarged scale in FIG. 3. It will be seen from FIGS. 2 and 3 that a pull lever 45 is supported pivotably about an axis indicated at 47, which is fixed to a side wall of the housing 1. The free end of the lever 45 is provided with an adjusting device 48 which rests on the topmost printed article in the stack 2 thereof. In FIG. 3 the level to which the uppermost printed article in the stack 2 has to be raised is indicated by an arrow bearing the letter H. When a printed article has been removed from the stack 2 the lever 45 of the sensing and control means 33 drops downwardly on to the printed article disposed therebeneath. Due to that downward movement, the brake 36 of the braking and stopping means 32 is released by way of the reduced pull applied by the vertically extending control cable 37, and thus the drive means 31 is enabled for operation. The spring of the drive means 31 can thus lift the table 30, in which case the holding cable 35 whose free end is connected to the table 30 is unwound from the cable drum 34. As the cable drum 34 co-operates with the gear transmission arrangement 42, that upward movement of the table 30 is not a sudden and abrupt movement but is a controlled conveyor movement which is damped and moderated by the action of the cable drum 34 and its co-operation with the transmission arrangement 42. During the upward movement of the table 30 at the same time the lever 45 of the sensing and control means 33 is pivoted into the horizontal position by the printed article which is now the topmost printed article of the stack 2, and the brake 36 is correspondingly actuated by the adjusting device 48, when the printed article-dispensing height H is reached. The rotary movement of the cable drum 34 is now stopped by way of the gear transmission arrangement 42 and the table 30 is retained in the position that it has now achieved, at the appropriate height for dispensing of a further article from the removal slot in the housing 1.

Figure 4:
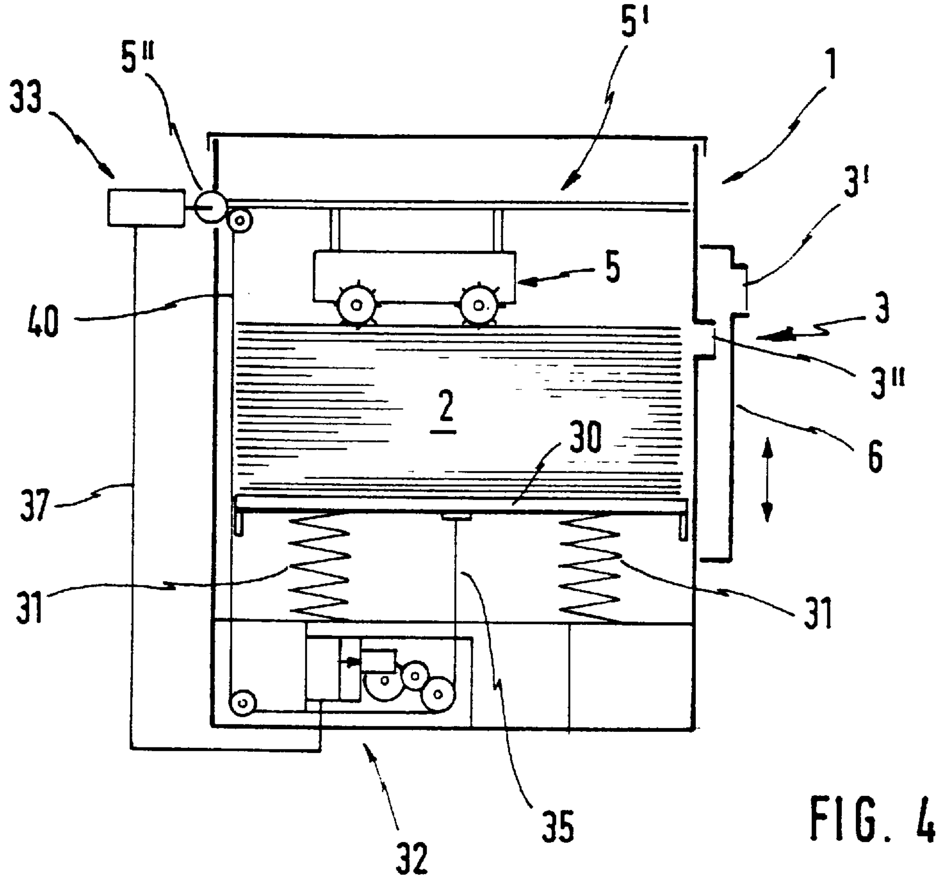
FIG. 4 shows a further embodiment of a dispensing apparatus according to the invention.

Reference will now be made to FIG. 4 showing a diagrammatic view of a further embodiment of the invention, in which the sensing and control means 33 comprise an electronic control unit which is responsive to angular inclination of the feed means 5 for advancing the topmost printed article on the stack 2 forwardly through the removal slot and out of the housing 1. The feed means 5 has a pivotable carrier 5' having a pivot axis indicated at 5", to which is coupled a sensor operable to output a signal to the braking and stopping means 32, in dependence on the angular position of the carrier 5'. The illustrated structure has two springs 31 for moving the table 30 upwardly in the housing 1 as articles are removed from the stack 2 thereon. The table 30 can be guided in the housing 1 by virtue of a simple angled configuration at the edges of the table. In this embodiment the removal means 3 is disposed at the front side of the housing 1, in which case the feed means 5 is activated to push a printed article from the stack 2 and out of the housing 1, upon actuation of a vertically guided slider generally indicated at 6 in FIG. 4. The slider 6 has an opening 3' from which the printed article can be removed when the opening 3' in the slider 6 is aligned with a dispensing opening 3" in the front wall of the housing 1.

Figure 5:
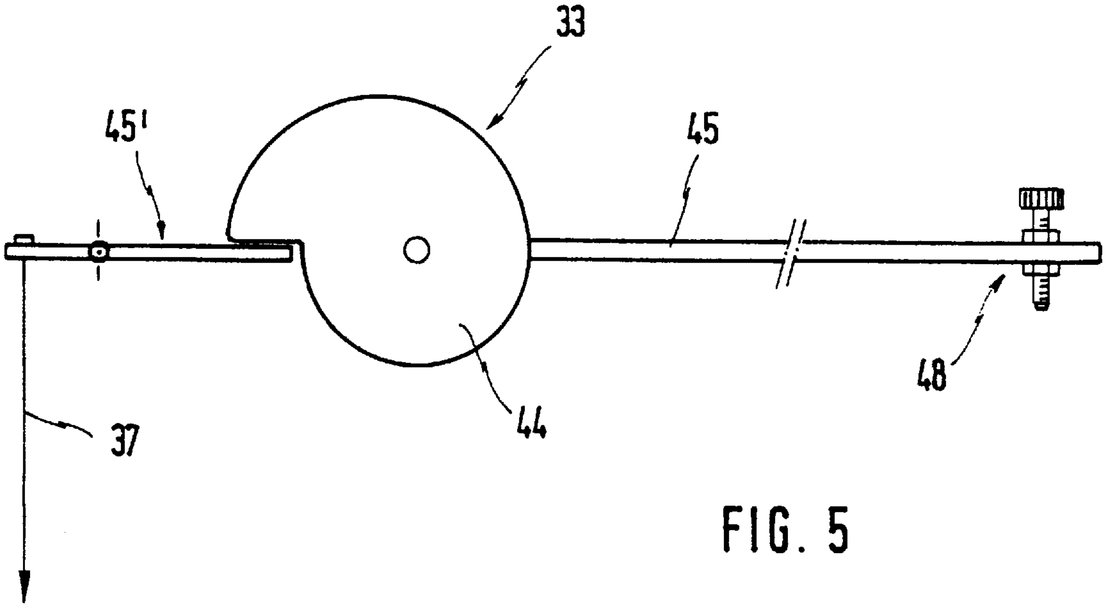
FIG. 5 shows an alternative configuration of the sensing and control means.

FIG. 5 shows an alternative form of the sensing and control means 33 for controlling the travel length of the table 30, that is to say the upward stroke movement thereof for progressively raising the stack so that the topmost printed article of the stack 2 is at the appropriate level in the housing 1 of the apparatus, for the topmost printed article to be removed from the stack. In this embodiment the lever 45 is connected rigidly to a cam disk 44. Upon downward pivotal movement of the lever 45 the cam disk 44 releases a second pull lever 45' which is in the form of a double-armed lever and which acts on the brake 36 by way of the vertically extending cable 37.

Figure 6:
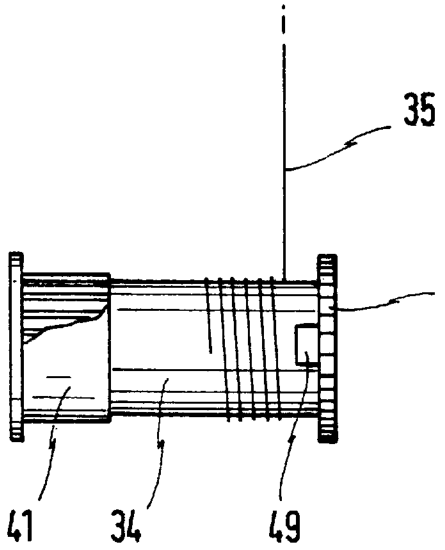
FIG. 6 is a detail view showing a cable drum with winding spring.

When the dispensing apparatus is in its completely emptied condition, the table 30 is at its topmost position and the holding cable 35 has been completely unwound from the cable drum 34. For the purposes of filling the apparatus again with printed articles, the door 38 is opened and then the table 30 is pushed downwardly within the housing 1 by hand, in which case at the same time a spring 41 which is shown in FIG. 6 and which is integrated in the cable drum 34 drives the cable drum 34 in rotation and thus causes the holding cable 35 to be wound on to the cable drum 34 again. A gear ring 34' which co-operates with the gear transmission arrangement 42 is connected to the cable drum 34 by way of a freewheel device as diagrammatically indicated at 49 so that the rotary winding-on movement of the cable drum 34 is not impeded by the gear transmission arrangement 42.

Figure 7:
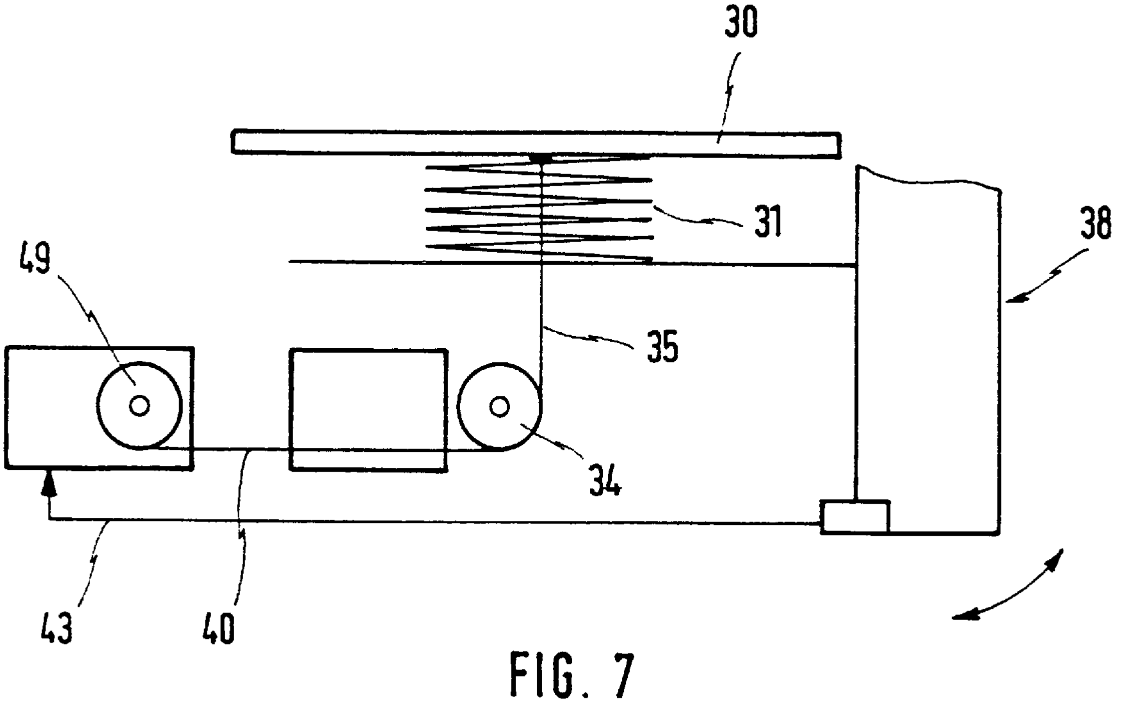
FIG. 7 is a diagrammatic view of a further rewinding structure and stop device.

An alternative embodiment of such a rewinding assembly has an additional winding drum which is indicated at 49 in FIG. 7, with a winding cable which is indicated at 40 in FIG. 7, and also at 40 in FIG. 4, with the winding cable 40 being wound on the cable drum 34 in opposite relationship to the holding cable 35 of which the free end is secured to the table 30. When therefore the table 30 moves upwardly, the winding cable 40 is rolled on to the cable drum 34 and is unwound therefrom again when the table 30 is pushed down by means of the winding spring 41 which acts on the winding drum 49, whereby the winding cable 40 is wound on to the winding drum 49.

Opening of the door 38 to the housing 1 provides that a brake acts on the winding drum 49 by way of stop means 43, to prevent unintentional movement of the table 30 in an upward direction, when the door is in the opened condition.

As an alternative to separate spring actuation during rewinding of the holding cable 35, the winding cable 40 can be fixed by way of suitable roller arrangements on the top side of the table 30. By virtue of the table 30 being pushed down, at the same time a pulling force is applied to the winding cable 40 and thereby the cable drum 34 is rotated back in the opposite direction and thus the holding cable 35 is wound on again. This structure also has stop means which act on the winding cable 40 in order to arrest the table 30 in any filling position thereof. When the door 38 is closed again, the stop means release the winding cable 40 so that it can be wound on to the cable drum 34 again, during the usual procedure for successive individual removal of printed articles from the stack.

It will be appreciated that the above-described embodiments of the apparatus according to the invention have been set forth solely by way of example and illustration of the principles of the invention and that various modifications and alterations may be made therein without thereby departing from the spirit and scope of the invention.

What is claimed is:

1. A dispensing apparatus for the separate dispensing of printed articles, including a housing, a table in the housing for holding in readiness a stack of printed articles disposed on the table, means mounting the table displaceably in the housing, a drive means for displacing the table by a desired travel length, sensing and control means for controlling said travel length, a removal means which permits access to a printed article to be dispensed, a feed means for pushing out a respective printed article from the stack, actuating means for activating the feed means, and a braking and stopping means for stopping and releasing the drive means.

2. Apparatus as set forth in claim 1 wherein the drive means has at least one spring as a power source for displacing the table.

3. Apparatus as set forth in claim 1 including a cable drum, a holding cable windable and unwindable on to and off the cable drum and having a free end, means connecting the free end of the cable to the table, and means connecting the braking and stopping means to the cable drum.

4. Apparatus as set forth in claim 1 wherein the sensing and control means effect control when the next printed article to be dispensed is to be positioned at said removal means.

5. Apparatus as set forth in claim 4 wherein the sensing and control means include lever means which by way of cable and roller means actuate a brake of the braking and stopping means.

6. Apparatus as set forth in claim 3 including a gear transmission arrangement co-operating with the braking and stopping means and operable to reduce the output rotary speed at the cable drum.

7. Apparatus as set forth in claim 3 wherein the relationship of the table, the holding cable and the cable drum is such that upon oppositely directed movement of the table when loading the apparatus with a stack of printed articles the holding cable is wound on to said cable drum.

8. Apparatus as set forth in claim 3 including a winding cable adapted to be wound in opposite relationship to the holding cable on the cable drum and having a free end secured to the table.

9. Apparatus as set forth in claim 3 including a winding drum, and a winding cable adapted to be wound on the winding drum in opposite relationship to winding-on of the holding cable, the winding cable having a free end secured to the table.

10. Apparatus as set forth in claim 3 including a winding spring acting on the cable drum in such a way that when the table is loaded with printed articles the cable drum is caused to rotate for winding on the holding cable.

11. Apparatus as set forth in claim 10 wherein said winding spring acts on said cable drum directly.

12. Apparatus as set forth in claim 1 including stop means for holding the table in a filling position for loading thereof.

13. Apparatus as set forth in claim 12 wherein the housing has an opening for loading the table with printed articles and a door for closing said opening, and the door is operable to activate the stopping means in the opened condition of the door.

14. A dispensing apparatus for dispensing printed articles individually from a supply stack in the apparatus, including a housing, guide means which in the position of use of the housing extend at least substantially vertically, a table in the housing for holding in readiness the supply stack of printed articles carried on the table, the table being guided in the housing along said guide means, a removal means for selective removal of a printed article from said housing, a feed means for displacing a respective printed article from said stack and feeding same to said removal means, actuating means for selectively activating the feed means for. individually dispensing a respective printed article by way of said removal means, a drive means urging said table upwardly along said guide means within said housing, sensing and controlling means for controlling the distance travelled by said table along said guide means thereby to position said table at a position for dispensing of the topmost printed article of said supply stack through said removal means, and braking and stopping means for stopping and releasing said drive means.

* * * * *